April 8, 1930. W. R. SCHOFIELD, JR., ET AL 1,753,319
CONTROL OF PROPORTIONS OF COMPONENTS OF GASEOUS MIXTURES
Filed March 7, 1924 3 Sheets-Sheet 1

INVENTORS
William R. Schofield Jr
and Robert L. Milner
BY Cornelius L. Ehret
their ATTORNEY

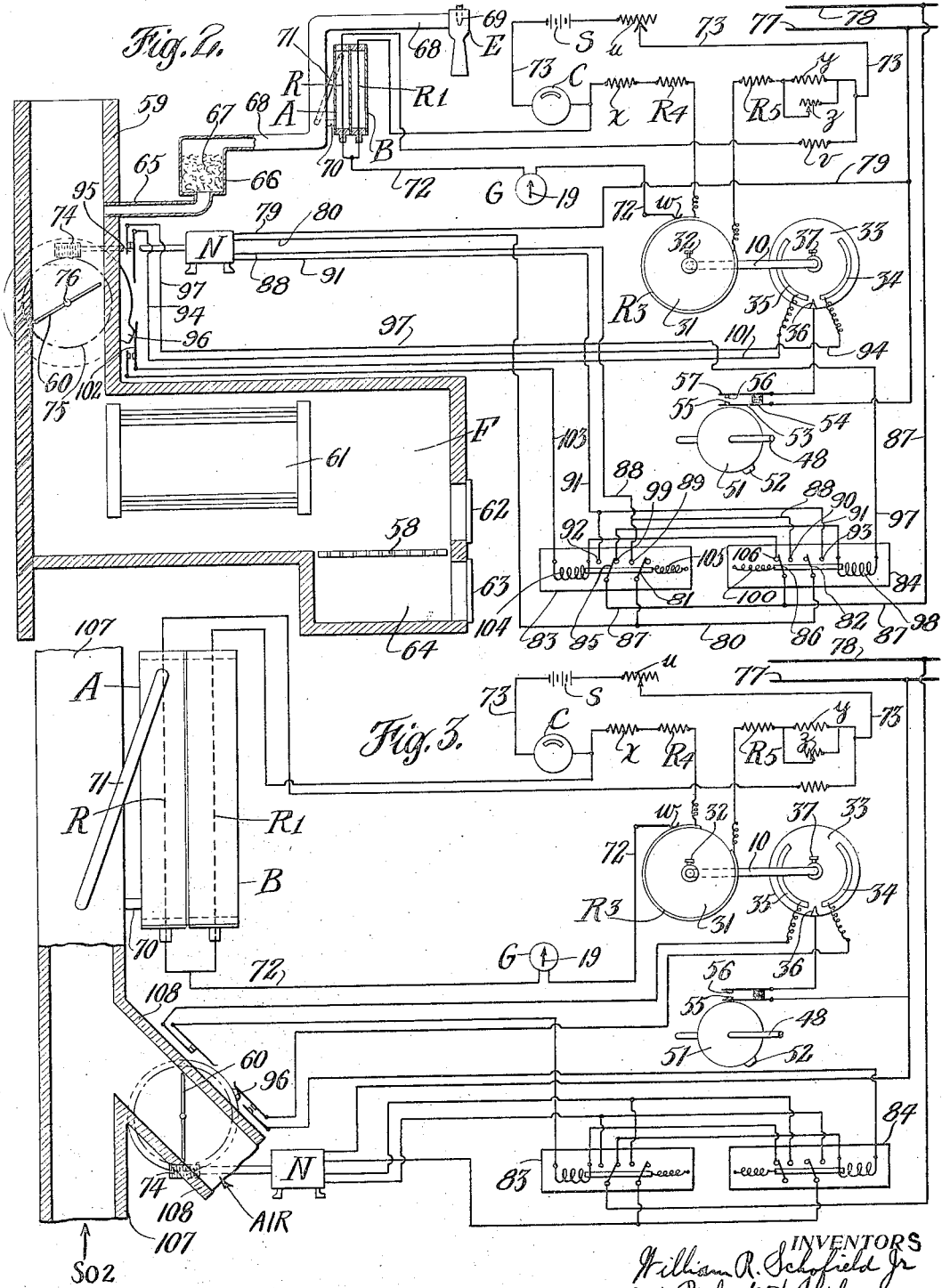

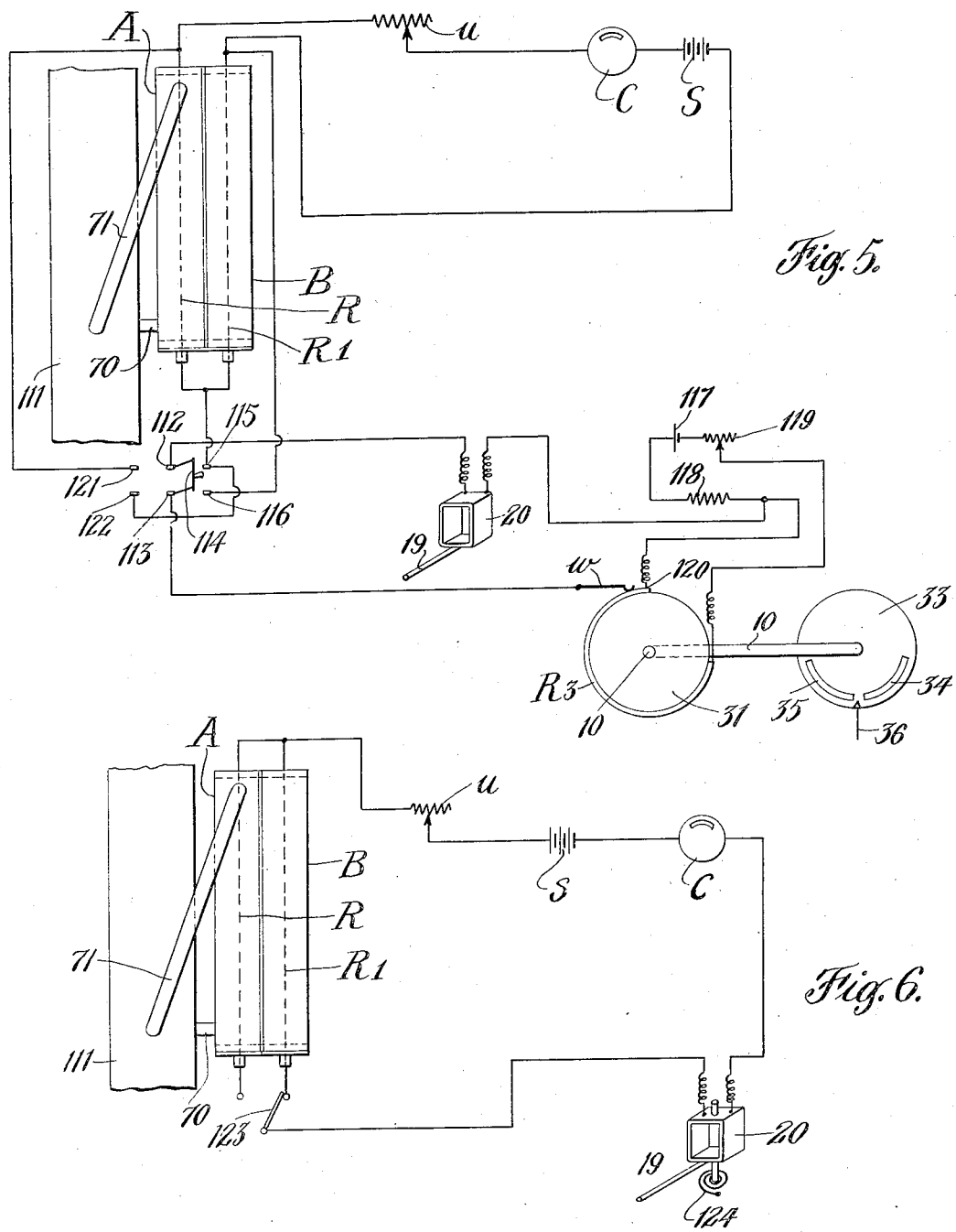

Patented Apr. 8, 1930

1,753,319

UNITED STATES PATENT OFFICE

WILLIAM R. SCHOFIELD, JR., AND ROBERT D. MILNER, OF PHILADELPHIA, PENNSYLVANIA, ASSIGNORS TO LEEDS & NORTHRUP COMPANY, OF PHILADELPHIA, PENNSYLVANIA, A CORPORATION OF PENNSYLVANIA

CONTROL OF PROPORTIONS OF COMPONENTS OF GASEOUS MIXTURES

Application filed March 7, 1924. Serial No. 697,484.

Our invention relates to the control of proportion of components of fluid mixtures, and more particularly to a control effecting a substantially constant relation between the quantities of different gases in a gaseous mixture.

Our system of control is applicable to a wide range of circumstances and for numerous purposes including, for example, the control of combustion in response to the amount or proportion of carbon dioxide in the waste or flue gases, the control of mixture or dilution of sulphur dioxide with or by another gas, as air, and the control of the proportions of components of an atmosphere in an oven, furnace, treating chamber or the like to maintain, for example, an oxidizing, reducing, neutral or other condition suitable to the nature of treatment to be effected.

In accordance with our invention, the control is effected in response to changes in thermal conductivity of a fluid mixture as affected by change in proportions of the components of the mixture.

More particularly in accordance with our invention, the changes in thermal conductivity are caused to affect a resistance or resistances of a Wheatstone bridge, or equivalent, whose galvanometer, or equivalent, controls a system which takes a position dependent upon the proportions of the components of the mixture, and in so doing effects control of a damper, valve or equivalent means to effect a change in the proportions of the components of the mixture.

Our invention resides in the method and apparatus of the character hereinafter described and claimed.

For an understanding of our method, and for an illustration of some of the various forms our system and apparatus may take, reference is to be had to the accompanying drawings, in which:

Fig. 2 is a vertical sectional view of furnace structure and a diagrammatic view of a circuit arrangement utilized for effecting control of combustion in the furnace.

Fig. 3 is a fragmentary sectional view of gas-mixing structure and a diagrammatic view of a circuit arrangement for effecting control of the mixture.

Figs. 5 and 6 illustrate modifications.

Figure 1:
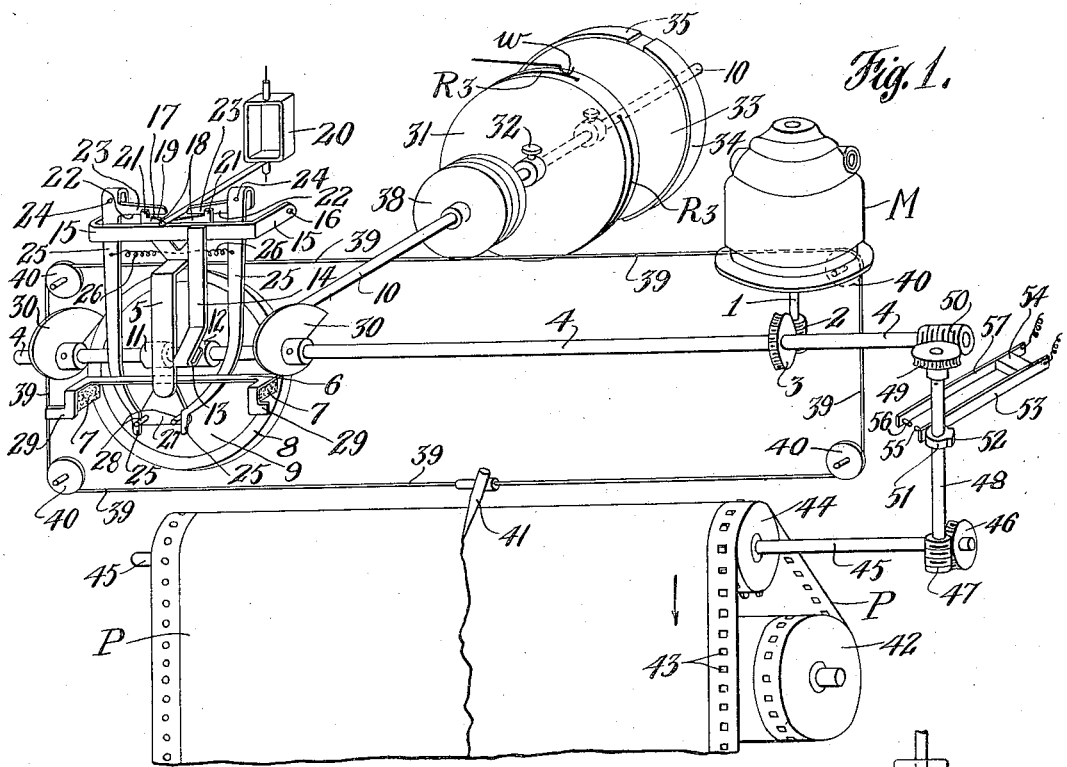
Fig. 1 is a perspective view of controller and recording mechanism utilized in the practice of our invention.

Referring to Fig. 1, there are illustrated the principal elements of one of the various controller and recording mechanisms utilizable for practicing our invention. In the example illustrated, the mechanism is of the character disclosed in Leeds' Patent No. 1,125,699, January 19, 1915, and comprises any suitable source of power, as an electric motor M, which rotates the shaft 1 at substantially constant speed as effected by a governor, not shown, which controls the speed of the motor M. Upon the shaft 1 is secured the worm 2 which drives the gear 3 secured upon the shaft 4. Upon pivots, not shown, is carried a lever 5, upon which is pivoted the arm 6, on each end of which is carried a shoe 7 of cork or equivalent material, frictionally engaging the rim 8 of the clutch disk 9 secured upon the shaft 10. A cam 11, secured upon and rotated by the shaft 4, periodically moves the lever 5 outwardly away from the disk 9 in opposition to a spring, not shown, thereby lifting the shoes 7 free from the rim 8, and after predetermined rotation of cam 11 the lever 5 is returned to position, bringing the shoes 7 again into engagement with the rim 8. A second cam 12, secured upon shaft 4, actuates the end of finger 13, when the shoes 7 are free of the rim 8. The member 13 is at the lower end of the arm 14, which is secured at its upper end to the member 15 pivoted at 16. Secured upon member 15 is the member 17, whose upper edge 18 is inclined upwardly and outwardly from the center. Disposed immediately above the edge 18 and normally swinging free thereof is the needle or pointer 19, of any suitable deflecting instrument, as, for example, a galvanometer whose movable element or coil 20 deflects the member 19, whose deflection is limited by the abutments 21 on the member 17 at the outer ends of the inclined edges 18. Above the needle 19 and beneath which it normally freely swings are the preferably straight and horizontal edges 22 of the members 23, pivoted, respectively, at 24 and extending toward each other, but having a gap between their inner ends of sufficient width to allow free entry of the needle 19 when in balanced, zero or mid position. The members 23, 23 have the downwardly extending arms 25, 25, biased toward each other by the spring 26. Attached to the lower end of the arm 5 is the triangular plate 27 carrying the pins 28, 28 co-operating with the lower ends of the members 25, 25. On opposite ends of the arm 6 are the ears or lugs 29, 29 adapted to be engaged, when the arm 6 has been deflected from its normal horizontal position, by the cams 30, 30, similar in contour and similarly positioned and secured upon the shaft 4.

As described in the aforesaid Letters Patent, when the galvanometer needle 19 deflects in one direction from its zero or mid position indicated, it is periodically clamped between the lower edge 22 of one of the members 23, under which it is deflected, and an edge 18 of the member 17, thereby deflecting the member 6, when the arm 5 has been moved outwardly by the cam 11, to an extent corresponding with the extent of deflection of the needle 19. Immediately thereafter the shoes 7 come again into engagement with the disk 8, and thereafter one of the cams 30 engages one of the ears 29 of the lever 6, restoring it to normal position indicated, and thereby carrying around with it the disk 8 and therefore the shaft 10 and the parts connected thereto. Similarly, deflection in opposite direction effects movement of the shaft 10 in opposite direction and to an extent corresponding to the extent of deflection of the needle 19.

Secured upon the shaft 10 is a disk 31, of insulating material, carrying upon its periphery the resistance conductor $R^3$, with which co-acts the stationary brush or contact $w$. The disk 31 may be secured in any suitable angular position on and with respect to the shaft 10 by the set screw 32.

Secured upon the shaft 10 is a second disk of insulating material 33, carrying upon its periphery the contacts 34 and 35 co-acting with the stationary brush or contact 36, Figs. 2 and 3. The disk 33 is secured to the shaft 10 by the set screw 37 in any suitable angular position with respect to the shaft 10, thereby effecting any suitable angular adjustment of the contacts 34 and 35 with respect to the resistance $R^3$.

Secured upon the shaft 10 is the grooved pulley wheel 38 for operating the cord 39, which is wrapped around the wheel 38 and passes over the idler pulleys 40 and is attached to the marker or recorder pen 41, movable under the control of the shaft 10, and therefore galvanometer needle 19, transversely of the recorder paper P, stored upon the roller 42 and having marginal perforations 43 in which engage teeth or pins upon the periphery of the roller 44, which in rotating unwinds the paper P from the drum 42 and moves it, in the direction of the arrow, with respect to the marker 41. The roller 44 is driven by the shaft 45, upon which is secured the gear 46 driven by the worm 47 secured upon the shaft 48 driven by the gear 49, with which meshes the worm 50 secured upon the shaft 4. Secured upon the shaft 48, or any other suitable shaft of the mechanism, is a cam 51, whose cam member or surface 52 is adapted periodically to engage and actuate the contact-supporting spring 53 secured to the insulating block 54 to bring the contact 55 into engagement with the contact 56 on the spring member 57, also carried by the block 54. The cam 51 and the contact mechanism controlled thereby are again shown in Figs. 2 and 3.

Referring to Fig. 2, F is a furnace or fire chamber in which combustion is effected, as of coal or the like, upon the grate 58, the spent or waste gases or products of combustion passing out through the stack or chimney 59, in which is disposed the movable damper or valve member 60. The furnace F may be that utilized for any purpose, such as for generation of steam in a steam boiler, or in general, for effecting heat transfer to any structure, such as 61, absorbing heat from the hot gases resulting from combustion. Fuel may be introduced as usual through the door 62, and the air for sustaining combustion may be admitted through the door or passage 63 into the chamber or ash pit 64 beneath the grate 58.

Tapped into the chimney or flue 59, at any suitable point, as above the damper 60, is a tube or conduit 65 communicating with the chamber 66, in which may be disposed suitable filtering material 67, such as absorbent cotton alone or with waste or similar material. Connecting with the discharge side of the chamber 66 is the tube or conduit 68 connecting with the suction chamber of an ejector or aspirator E, to whose nozzle 69 is delivered motive fluid, either elastic, as steam, or liquid, as water, producing a jet which entrains the gas mixture entering from the stack 59 through the filter 67 into the suction chamber of the ejector E, whereby the ejector continuously draws from the stack 59 a sample or small proportion of the spent gases or products of combustion ascending in the flue 59.

In the chamber or cell A is disposed the resistance wire or conductor R, and in the adjoining cell or chamber B is disposed the resistance conductor $R^1$, the conductors R and $R^1$ being fine wires of platinum, or other suitable metal or material having substantial temperature co-efficient. Confined within the chamber B is a volume of air or other suitable gas or other medium, which may be termed the standard gas or medium and through the cell A is passed a small portion or sample of the gas mixture withdrawn by the aspirator E through the conduit 68 from the stack 59. The current of the gas to be analyzed or which co-operates in effecting a control in response to changes in the proportion of its components, and which for brevity may be termed the unknown gas, is effected by any suitable means and at any suitable rate. In the example illustrated, however, it is effected solely by convection, and is independent of the pressure and velocity of the gas within the conduit 68. The convection is effected by connecting one end, as the lower end, of the cell A with the conduit 68 by the tubular connection 70, and by connecting the opposite end of the cell A by a tube 71 with the conduit 68 at a point longitudinally thereof corresponding with the point of connection thereto of the tube 70, whereby there is no difference in pressure between the inlet to the tube 70 and the outlet of the tube 71, and accordingly the unknown gas circulates through the cell A by convection only and is independent of pressure and velocity of the gas passing through the conduit 68.

The resistances R and $R^1$ are connected in adjacent arms of a Wheatstone bridge, one of whose conjugate conductors 72 connects with both resistances R and $R^1$ and with the stationary contact $w$, which bears upon the resistance $R^3$ carried by the disk 31. In series in the conductor 72 is connected the galvanometer G comprising the coil 20 and needle 19 shown in Fig. 1. The other conjugate conductor 73 of the Wheatstone bridge includes the source of current or battery S and the ammeter C and the adjustable resistance or rheostat $u$.

In the same arm of the bridge with the resistance R is the resistance $v$, having small or zero temperature co-efficient, of a magnitude to compensate for changes in value of the current from the battery S which traverses and heats the resistances R and $R^1$, the heating current being adjusted to predetermined suitable magnitude, indicated or measured by the ammeter C, by the rheostat $u$. In the third arm of the bridge is a resistance $R^5$, of small or zero temperature co-efficient, together with a resistance $y$, shunted by the variable resistance $z$, both of small or zero temperature co-efficients, and effecting in combination such magnitude of resistance as to compensate for permanent changes in either or both of the resistances R, $R^1$. In the fourth arm of the bridge is the resistance $R^4$, of small or zero temperature co-efficient, and in series therewith may be utilized the resistance $x$, of nickel or other material having substantial temperature co-efficient, subjected to the temperature of the ambient air or atmosphere, and compensating for changes in temperature of the air or atmosphere surrounding the cells A and B.

In the third arm of the bridge is included that varying or variable portion of the resistance $R^3$ which lies in counterclockwise direction from the contact $w$, as viewed in Fig. 2; and in the fourth arm of the bridge is included that varying or variable portion of the resistance $R^3$ lying in clockwise direction from the contact $w$.

Upon change in the amount of carbon dioxide ($CO_2$), for example, or upon change in its proportion to the other gases in mixture therewith and escaping through the flue 59, the thermal conductivity of the gas mixture in the cell A will correspondingly change, and there will be accordingly a change in the rate of delivery of heat by the hot wire R to the surrounding gas in cell A, with consequent change in temperature, and therefore resistance, of the wire R, while the temperature and resistance of the wire $R^1$ remains substantially constant, with the result that the Wheatstone bridge is unbalanced, causing deflection of the galvanometer needle 19 to an extent corresponding to the change in amount of proportion of the carbon dioxide in the gas mixture, and in one sense or direction for increase in amount or proportion of carbon dioxide in the gas mixture and in opposite sense or direction for decrease in the amount or proportion of carbon dioxide.

Accordingly, the mechanism, of the character indicated in Fig. 1, under the control of the galvanometer needle 19, causes rotation of the shaft 10, and therefore of resistance $R^3$ with respect to contact $w$, in direction and extent corresponding to the direction and extent of deflection of the needle 19. The parts are so disposed with respect to each other that the direction of movement of resistance $R^3$ with respect to its contact $w$ is such as to balance or tend to balance the Wheatstone bridge by the resultant change in amounts of resistance $R^3$ in the third and fourth bridge arms. This movement of shaft 10 and resistance $R^3$ is accompanied by movement of the recorder marker 41 transversely of the paper P, thereby producing, as time elapses, a record upon the sheet P of the changes in quantity or proportion of carbon dioxide in the flue gases.

When the bridge is in balance for a predetermined or desired amount or proportion of carbon dioxide in the flue gases, the disk 33 will be in such position that the contact 36 is midway between the contacts 34 and 35. As soon, however, as the bridge is unbalanced, due to change in amount or proportion of the carbon dioxide from the predetermined or desired standard amount, one or the other of the contacts 34, 35 will engage the stationary contact 36 and thereby, subject to the periodic control by the cam 51, cause energization of the motive device N of any suitable character, but in the example illustrated a motive device, such as an electric motor, utilizing electrical energy. The motor N rotates a worm 74, which drives the gear 75 secured upon the stem or shaft 76 of the aforesaid damper or valve member 60 to shift its position within the stack or flue 59 and thereby vary the rate of discharge of gases from chamber F, the draft, or, in general, vary the conditions of combustion upon which depends the amount or proportion of carbon dioxide in the flue gases. The motor N is reversible, so that upon decrease of the proportion of carbon dioxide from the predetermined or desired amount or proportion the armature of the motor N will rotate in such direction as to effect flue-closing movement of the damper 60 to effect such condition regarding the combustion as to cause increase in the amount or proportion of carbon dioxide. And similarly, the armature of the motor N rotates in opposite direction to effect a control in opposite sense.

One of various modes of effecting the control of the motor N will now be described. From one of the current supply conductors 77, 78 connection is made by conductor 79 with one terminal of the series field winding of the motor N, the other terminal of that winding connecting by conductor 80 with the movable contact members 81 and 82 of the relays 83 and 84, respectively, whose movable contacts 85 and 86 connect with the conductor 87 connecting with the other supply circuit conductor, as 78. One terminal of the armature of the motor N connects by conductor 88 with the contacts 89 and 90, with which co-act, respectively, the movable contact members 81 and 86. The other terminal of the armature of motor N connects by conductor 91 with the contacts 92 and 93, with which co-act, respectively, the movable contact members 85 and 82. The contact or brush 36 is connected to the contact 56, into engagement with which the cam 51 periodically brings the contact 55, the duration of contact being made anything suitable or desirable, to ensure periods of interruption of operation of the motor N so as to effect a time lag or delay in the operation of the damper 60, so that the control will not hunt or overshoot to undesired degree. The contact 55 is connected with the current supply conductor 77, and the contact 34 is connected through conductor 94 through the limit switch 95, controlled by the cam 96 movable with the damper 60, with the conductor 97, which connects to one terminal of the winding 98 of the relay 84, the other terminal of the winding 98 connecting with the contact 99 of the other relay 83 and co-acting with the movable contact member 85 thereof, the latter connected to the other supply conductor 78, whereby with the movable contact 85 in engagement with contact 99, as indicated, and when contacts 55 and 56 are in engagement with each other and the limit switch 95 closed, current, when contact 34 is in engagement with contact 36, will energize the relay winding 98, causing it to attract its armature or core toward the right, in opposition to spring 100, to bring the contact members 86 and 82 into engagement with contacts 90 and 93, causing energization of the motor N and rotation of its armature in a predetermined direction to operate the damper 60 in a predetermined direction, until the cam 51 moves to such position as to separate contacts 55 and 56, whereupon the relay 84 will be deenergized and the spring 100 will return the contact members 82 and 86 to the position indicated. If, however, engagement between contacts 34 and 36 persists, the relay 84 will be again energized upon the next revolution of the cam 51, bringing the contacts 55 and 56 into engagement with each other, with resultant further operation of the motor N in the same direction as before, and operation of the motor will proceed, periodically, in the same direction either until the bridge is rebalanced and contact 34 is removed from brush 36 or until the cam 96 opens the limit switch 95, in both of which cases the relay 98 will be deenergized and continue so.

Should the disk 33 deflect in opposite direction from normal position indicated. the contact 35 will be in engagement with brush 36 and connection will be made through conductor 101 through the limit switch 102, if closed, and conductor 103 with one terminal of the winding 104 of relay 83, causing it to attract its armature or core in opposition to spring 105 to shift the movable contact members 81 and 85 into engagement with contacts 89 and 92, respectively, thereby causing energization of the motor N, and rotation of its armature in opposite sense to that before described to operate the damper 60 in opposite direction, the limit switch 102 opening the circuit of the relay 83 when the cam 96 attains the position illustrated.

It will be noted that the relay winding 98 can be energized only when the movable contact 85 of relay 83 is in engagement with contact 99; and similarly, that the relay 83 can be energized only when the movable member 86 of relay 84 is in engagement with contact 106. Accordingly, when one relay is energized the other is in effect locked out or the circuit of its energizing winding opened to prevent its operation.

Accordingly, the function of the contacts 34 and 35 is to determine the direction of rotation of the armature of the motor N and therefore direction of movement of the damper 60, the intervening relays being preferably utilized. The function of the switch 55, 56 is to cause in effect gradual or retarded operation of the damper 60 to the desired or proper position, and the limit switches 95 and 102 ensure deenergization of the motor N at each limit of travel of the damper 60, the angular distance of travel of the cam 96 from position in which it opens one limit switch to the position in which it opens the other determining the total angular extent of movement of the damper 60.

It will accordingly be understood from the foregoing that in response to changes of thermal conductivity of a gaseous mixture due to change in proportion of a component gas a control is effected which changes the proportion of the components of the gaseous mixture, and preferably in a sense to attain a predetermined or desired proportion. More specifically, the control, as of rate of discharge of gases through flue 59, is responsive to changes in proportion of carbon dioxide in the flue gases to effect a change in the rate of or other characteristic of the combustion to cause the proportion of carbon dioxide to be maintained at a predetermined or desired magnitude.

In Fig. 3, there is connected with the tube or conduit 107, into whose lower end is delivered a gas, for example, sulphur dioxide ($SO_2$), the branched pipe or tube 108, through which another gas, as air, in amounts controlled by the valve or damper 60, is introduced into mixture with the gas in the conduit 107, whereby the mixture discharged from the conduit 107 shall contain the two gases in a desired or predetermined proportion or, otherwise stated, whereby the sulphur dioxide will be to proper degree diluted with air. The cell A is in this instance connected with the conduit 107, and there is passed through the cell the mixture of gases in the manner described in connection with Fig. 2. In the cell B is sealed or retained a volume of any suitable standard medium, fluid or gas, as air. In this system again the control is of the nature described in connection with Fig. 2, the damper 60, controlling influx of air, responding to the control in response to the changes in thermal conductivity of the gas mixture in the cell A.

Figure 4:
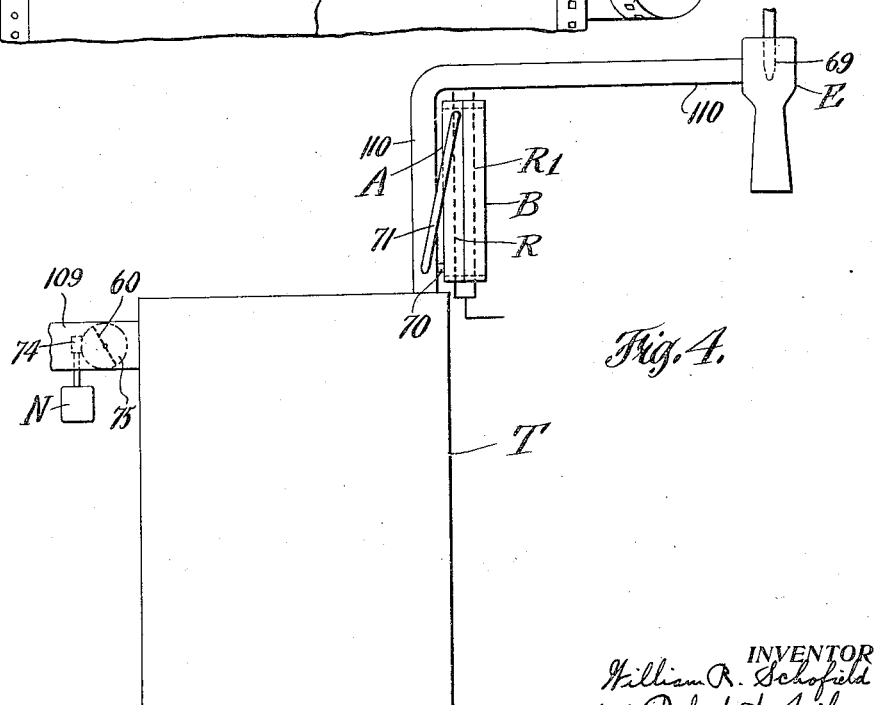
Fig. 4 is a fragmentary view illustrating a treating chamber or the like with means for controlling the nature of the atmosphere within the chamber.

In Fig. 4 T represents an oven, furnace, or treating chamber into which there is introduced through the conduit 109 gas of any character suitable for purposes of the operations or treatment taking place within the chamber T. For example, the gas may be of such nature that the atmosphere within the chamber T shall be made or maintained oxidizing, reducing, neutral or of any other desired characteristic. A small portion of the gas or atmosphere within the chamber T may be continuously drawn off by the ejector E through the tube or pipe 110, and a portion of this gas passes through the cell A, as described in connection with Fig. 2. In the chamber B is sealed or maintained a volume of a medium, fluid or gas of a character suitable for the purpose and operating as the standard medium or gas. In this instance again the change of thermal conductivity of the gas mixture constituting the atmosphere within the chamber T causes a control of the damper 60 to control the influx into the chamber T of gas in quantity sufficient to impart to the atmosphere in the chamber T the desired characteristic.

While in the foregoing description we have referred more particularly to a Wheatstone bridge as a suitable type of control circuit, it will be understood that our invention is not limited thereto and that any other suitable circuit arrangement may be employed, to the end that changes in thermal conductivity affect the control circuit to produce deflections of a galvanometer, or equivalent instrument. It is preferred however, though not necessary, that the control circuit is affected by changes in magnitude of a resistance of a conductor having substantial temperature co-efficient and disposed in heat transfer relation to the fluid mixture.

For an illustration of one of the aforesaid substitutes for a Wheatstone bridge, reference is had to Fig. 5 wherein the control circuit is of the potentiometer type, operating upon changes in magnitude of potential differences due to fall of potential in a resistance traversed by current. In this figure the tube or conduit 111 may correspond with the tubes 68, 107, and 110, of Figs. 2, 3 and 4, respectively, and represents in general a tube or conduit through which a fluid mixture passes. In this example current from the source S is passed through the two resistance wires R and $R^1$ in series with each other, the current magnitude being again determined and measured respectively by the rheostat $u$ and ammeter C. The galvanometer whose coil is 20 and needle 19 again controls through any suitable mechanism, such for example as indicated in Fig. 1, or equivalent, a damper, valve or equivalent such as indicated at 60 in Figs. 2, 3 and 4. In this instance however the galvanometer is in a circuit or branch whose terminals 112 and 113 may be thrown by the switch 114 into communication with the terminals 115 and 116 connected respectively to the terminals of the standard resistance $R^1$ with the result that there is impressed upon the galvanometer circuit or branch a potential difference corresponding with the fall of potential across the resistance $R^1$, whose magnitude is dependent upon the resistance of the conductor $R^1$ and the magnitude of the current from source S traversing it. The resistance $R^3$, on disk 31, of structure as indicated in Figs. 1, 2 and 3, is in series with the battery or source of current 117, resistance 118 and adjustable resistance 119 utilized for predetermining the magnitude of current traversing the resistance $R^3$. When the contact $w$ engages the resistance $R^3$ at such point that the fall of potential between the contact $w$ and the terminal 120 of the resistance $R^3$ is equal to the fall of potential between the terminals of the resistance R¹, the system is in balance and the galvanometer whose coil is 20 does not deflect. To standardize the apparatus, the rheostat 119 is adjusted to such position that the fall of potential between the brush w and the terminal 120 is equal to the fall of potential across the resistance R¹ for a predetermined position of the brush w with respect to the resistance R³. Upon throwing the switch 114 to its other position in engagement with contacts 121 and 122, the latter connected to contact 115, there will be impressed upon the galvanometer branch a potential difference corresponding with the potential drop between the terminals of the resistance R which is in heat transfer relation with the fluid mixture in the cell A. If this potential difference is equal to the potential difference between the brush w and the terminal 120 of resistance R³, the galvanometer will not deflect. If these potential differences are unequal the galvanometer 20 will deflect in one direction or the other with resultant movement of the disk 31 in such direction and to such extent as to effect a balance between these potential differences and the movement effecting this re-balance produces a record and also produces a control of the character described in connection with Figs. 2 and 3, by the action of the contacts 34 and 35 and the subsidiary apparatus including the motor N.

It will be understood that the second cell B and its resistance R¹ are not necessarily employed, though they are desirable for standardization purposes described. When the cell B and its resistance R¹ are not employed the resistance R alone is in circuit with the source S and the galvanometer circuit or branch may be connected permanently to the terminals of the resistance R without recourse to the switch 114.

Referring to Fig. 6 the galvanometer whose coil is 20 may be thrown by the switch 123 into series with either the resistance R or R¹ and the source of current S. The galvanometer coil 20 may have applied thereto a control tortion spring 124 whose effect upon the coil opposes the effect of the current traversing the coil from the source S through either the resistance R or R¹. When the galvanometer is in circuit with the resistance R¹ the rheostat u may be adjusted to effect such magnitude of current through the resistance R¹ and the galvanometer as to effect a predetermined standard normal or zero position of the galvanometer coil 20. After such or equivalent standardization is effected, the switch 123 may be thrown to its other position in which case the resistance R¹ is out of circuit and there is substituted therefor the resistance R whose magnitude changes in accordance with the changes in its loss of heat to the fluid traversing the tube 111 and as a consequence the magnitude of the resistance of the circuit including the galvanometer 20 changes, with resultant change in current therein and therefore resulting in change in deflection of the galvanometer whose needle 19 is utilized to effect control through any suitable control apparatus of a damper or valve structure as 60, Figs. 2, 3 and 4, or in any other suitable relation.

It is characteristic of the above described examples of application of our invention that by changes in thermal conductivity of a gas mixture due to change in proportion of the components of the mixture there is effected a change in the proportion of those components, and more particularly a change in the proportion of the components in such sense as to cause the proportion to return to or be maintained at a predetermined or desired magnitude.

While we have hereinbefore referred more particularly to gases, it will be understood that our invention is not limited in this respect, for our method of control in response to changes in thermal conductivity is applicable also to mixtures of fluids in general, including mixtures of different liquids, different permanent gases, different vapors, or mixtures of gas and vapor. Accordingly, in the appended claims the term "fluid" is generic and the term "gas" more specific but generic to permanent gas and vapor.

It will be understood that our invention is applicable both in the case where the fluids in or coming into mixture with each other are of a character producing chemical reaction, and in the case where there is no chemical reaction and the fluids are chemically neutral with respect to each other and maintain their individual chemical characteristics.

What we claim is:

1. A control system comprising means responsive to the thermal conductivity of a mixture of fluids, control mechanism controlled by said means, a member controlling the proportion to each other of the fluid components of said mixture, a motive device controlling said member and controlled by said control mechanism, and means for periodically interrupting the operation of said motive device.

2. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in directions and to extents corresponding with the direction and extent of deflection of said galvanometer, a member controlling the proportion to each other of the fluid components of said mixture, a reversible motive device controlling said member, and switching mechanism controlling said motive device and effecting operation thereof in opposite directions in response to movements of said movable system in opposite directions.

3. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in directions and to extents corresponding with the direction and extent of deflection of said galvanometer, a member controlling the proportion to each other of the fluid components of said mixture, a reversible motive device controlling said member, switching mechanism controlling said motive device and effecting operation thereof in opposite directions in response to movements of said movable system in opposite directions, and a periodically operated switch interrupting operation of said movable device.

4. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in directions and to extents corresponding with the direction and extent of deflection of said galvanometer, a member controlling the proportion to each other of the fluid components of said mixture, a reversible motive device controlling said member, switching mechanism controlling said motive device and effecting operation thereof in opposite directions in response to movements of said movable system in opposite directions, and a switch periodically operated by said source of power for interrupting the operation of said motive device.

5. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in response to changes in thermal conductivity of said mixture, a member controlling the proportion to each other of the fluid components of said mixture, means for operating said member, and switching means movable with said movable system controlling said operating means.

6. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in response to changes in thermal conductivity of said mixture, a member controlling the proportion to each other of the fluid components of said mixture, means for operating said member, switching mechanism movable with said movable system, and a relay controlled by said switching mechanism and controlling said operating means.

7. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in response to changes in thermal conductivity of said mixture, a member controlling the proportion to each other of the fluid components of said mixture, means for operating said member, switching mechanism movable with said movable system, a relay controlled by said switching mechanism and controlling said operating means, and a switch periodically interrupting control of said relay by said switching mechanism.

8. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in response to changes in thermal conductivity of said mixture, a member controlling the proportion to each other of the fluid components of said mixture, means for operating said member, switching mechanism movable with said movable system, a relay controlled by said switching mechanism and controlling said operating means, and a switch actuated by said source of power periodically interrupting control of said relay by said switching mechanism.

9. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in response to changes in thermal conductivity of said mixture, a member controlling the proportion to each other of the fluid components of said mixture, means for operating said member, switching mechanism movable with said movable system, a relay controlled by said switching mechanism and controlling said operating means, and a switch operated after predetermined movement of said member and controlling said relay.

10. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in directions and to extents corresponding with the direction and extent of deflection of said galvanometer, a member controlling the proportion to each other of the fluid components of said mixture, means for operating said member in opposite directions, and switching mechanism moving in unison with said movable system controlling said operating means for effecting movements of said member in opposite directions.

11. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in direction and to extents corresponding with the direction and extent of deflection of said galvanometer, a member controlling the proportion to each other of the fluid components of said mixture, means for operating said member in opposite directions, switching mechanism movable in opposite directions in unison with said movable system, and relays controlling said operating means and respectively controlled by movements of said switching mechanism in opposite directions.

12. A control system comprising a heated resistance having a substantial temperature co-efficient, means for bringing a fluid mixture of temperature different from the temperature of said resistance into heat transfer relation therewith, a galvanometer controlled by said resistance, a source of power, a movable system, said galvanometer controlled by said resistance and controlling actuation of said movable system by said source of power in directions and to extents corresponding with the direction and extent of deflection of said galvanometer, a member controlling the proportion to each other of the fluid components of said mixture, means for operating said member in opposite directions, switching mechanism movable in opposite directions in unison with said movable system, relays controlling said operating means and respectively controlled by movements of said switching mechanism in opposite directions, and a periodically operated switch effecting interruption of operation of said member by said operating means.

WILLIAM R. SCHOFIELD, Jr.
ROBERT D. MILNER.